United States Patent
Breitschwerdt et al.

[11] 3,719,248
[45] March 6, 1973

[54] DOOR LOCK, ESPECIALLY FOR MOTOR VEHICLES

[75] Inventors: Werner Breitschwerdt, Stuttgart; Gunter Gmeiner, Sindelfingen; Christian Grabner, Maichingen; Gerhard Sigmund, Stuttgart, all of Germany

[73] Assignee: Daimler-Benz Aktiengesellshaft, Stutgart-Unterturkheim, Germany

[22] Filed: May 14, 1971

[21] Appl. No.: 143,335

[30] Foreign Application Priority Data

May 15, 1970 Germany.....................P 20 23 859.9

[52] U.S. Cl.............................180/112, 292/DIG. 22
[51] Int. Cl................................................E05c 3/36
[58] Field of Search........292/DIG. 22; 180/111, 112, 180/113

[56] References Cited

UNITED STATES PATENTS 2,864,641  12/1958  Leslie...............................180/112 X
3,453,015  7/1969  Miller..............................180/113 X

*Primary Examiner*—Gerald M. Forlenza
*Assistant Examiner*—Frank E. Werner
*Attorney*—Craig, Antonelli & Hill

[57] ABSTRACT

A door lock, especially for motor vehicles, which is equipped with a pull handle and with a device preventing movement caused by forces due to inertia of those parts of the door lock which are movable and have a significant weight; the device for preventing such movement includes, in addition to the pivotally mounted pull handle, a rod connected to the end of the pull handle opposite its pivotal support which extends into the interior of the door where an equalization mass is pivotally supported in such a manner that in case of a sudden change in the direction of movement initiating the inertia forces, a pivoting of the pull handle in the opening direction is prevented.

6 Claims, 6 Drawing Figures

INVENTORS
WERNER BREITSCHWERDT
GÜNTER GMEINER
CHRISTIAN GRABNER
GERHARD SIGMUND

BY Craig, Antonelli & Hill

ATTORNEYS

INVENTORS
WERNER BREITSCHWERDT, GÜNTER GMEINER
CHRISTIAN GRABNER, GERHARD SIGMUND

BY Craig, Antonelli & Hill
ATTORNEYS

INVENTORS
WERNER BREITSCHWERDT
GÜNTER GMEINER
CHRISTIAN GRABNER
GERHARD SIGMUND

DOOR LOCK, ESPECIALLY FOR MOTOR VEHICLES

The present invention relates to a door lock, especially for motor vehicles, with a pull handle and with a mechanism, operable by moments of inertia acting on movable parts significant as regards their mass, for the prevention of their movements caused by forces due to inertia. The present invention is intended to bring about that the lock does not open automatically, for example, in case of a vehicle accident. In order to prevent this, an installation for the equalization of the inertia forces or an installation for the prevention of their movement caused by inertia forces is provided at the movable door lock parts which have a significant weight.

An arrangement for the prevention of the unintentional opening of the door or of its lock mechanism, especially in case of impacts, is known in the prior art, which normally can be opened by hand from its closing or locking position by pressing in a spring-loaded external door knob. In order to avoid an undesirable interaction of the forces due to inertia of the door knob in the presence of large accelerating forces which have occurred as a result of an accident impact, a two-armed lever pivotally supported in the lock housing has been installed heretofore, whose one arm is supported on the locking mechanism and whose other arm carries an equalization weight matched to a preselected acceleration value. The opening movement of the locking mechanism is thereby prevented by engagement of a form-locking locking element during the occurrence of accelerations in the opening direction by means of a rotatable lever.

These prior art installations cannot be applied without substantial changes to a motor vehicle door lock to be opened by means of a pull handle. The pull handle has to be constructed sturdy and must include a strong pivot bearing support since it not only has the task to pull open the locking mechanism of the door, but also to bring the door into its opened position.

For such a pull handle lock, which does not open also in case of lateral impact movements of the vehicle, it is proposed according to the present invention that the pull handle pivotally mounted at one end thereof at the door, is provided at its other end with a rod or stem that enters through the outer sheet metal cover panel of the door into the door interior, in which an equalization mass is pivotally supported in such a manner that in case of a sudden change in the direction of movement pressing the same toward the outer door body panel, it prevents a pivoting of the pull handle in the opening direction.

In this manner, the forces due to inertia, which occur in case of a sudden deceleration at the handle as constituting the significant movable part as regards weight, are compensated for and equalized in their entire magnitude, and the handle can be prevented from a movement caused otherwise by these forces.

The forces due to inertia of a lever pivotally supported at the door outer sheet metal body panel or at the handle plate can be used as equalizing force, whose one arm engages at the handle rod extended as locking lever whereas the other free arm is constructed as equalization weight for the opening force released by the weight of the pull handle in case of an impact against the vehicle side.

The length of the lever arm and its center of gravity as the point through which the forces act, are constructed corresponding to the ratio of the forces effective at the lever arms or leg portions. In a preferred embodiment of the present invention, the lever pivotally supported at the door outer sheet metal body panel or at the handle plate is pivotally supported close to the handle stem or rod extended to the lock as latching or locking lever. As a result thereof, the end of the one arm of the lever may hook into an abutment projecting transversely to the handle stem and may thus prevent a pivot movement of the lever and therewith of the handle, possibly initiated externally by the effect of an impact. In case of an impact effect from the inside toward the outside, the forces at the lever occur in the locking direction so that the handle is not displaced notwithstanding the disengaged lever.

A further preferred solution for the prevention of the occurrence of forces due to inertia of the pull handle which may cause a dangerous opening of the door lock may reside in a particular construction of the handle itself, in which its weight by an extension in the longitudinal direction selected for a predetermined acceleration value of the handle part forms the rigid counter-weight. Appropriately, the pivot bearing customarily provided at one end of the handle part is arranged in the center of gravity of the entire pull handle inclusive its extension with the counter-weight.

A readily possible, automatic to and fro movement of the handle can be reliably prevented by an arrangement of a weak tension spring between the more weighty arm of the equalization lever and the handle plate at the inside. The strength of this spring is so selected that the pivoting of the handle for the lock opening cannot be prevented thereby.

According to the present invention, every opening of the door may also be prevented by an automatic blocking of ever pivot movement of the door handle. For this purpose, the lever is preferably constructed as angle lever or bell crank whose one leg portion serves as equalization arm for the forces due to inertia. The other lever leg portion which extends approximately up to the handle, is provided with a nose portion engaging into a recess in the handle rod. In case of an impact from the outside, the lever pivots toward the handle rod and the nose portion of the one lever leg portion drops into the recess of the handle rod and thereby locks any handle movement; hence, the lock and door cannot be opened.

In order to avoid an unintentional locking of a handle by means of a mass equalization, a leg spring may be mounted advantageously at the equalization arm of the bell crank, whose one leg portion abuts at an abutment fixedly arranged in the housing and whose other leg portion abuts under prestress at the pivot axis of the bell crank, which constantly forces the bell crank into a position in which the handle rod and therewith the pull handle are freely pivotal. Instead of the leg spring or in combination with the same, a compression spring may also be installed at the equalization arm of the pivot lever.

Accordingly, it is an object of the present invention to provide a door lock, especially for motor vehicles, which avoids by simple means the aforementioned shortcomings and drawbacks encountered in the prior art.

Another object of the present invention resides in a door lock mechanism for use in particular with vehicle doors adapted to be opened and closed by a pull handle which reliably precludes the inadvertent opening of the door in case of accidents.

A further object of the present invention resides in a door lock, especially for motor vehicles, which is simple in construction, reliable in operation and particularly suited for pivotal pull handles.

These and other objects, features and advantages of the present invention will become more obvious from the following description when taken in connection with the accompanying drawing which shows, for purposes of illustration only, several embodiments in accordance with the present invention, and wherein.

Figure 5:
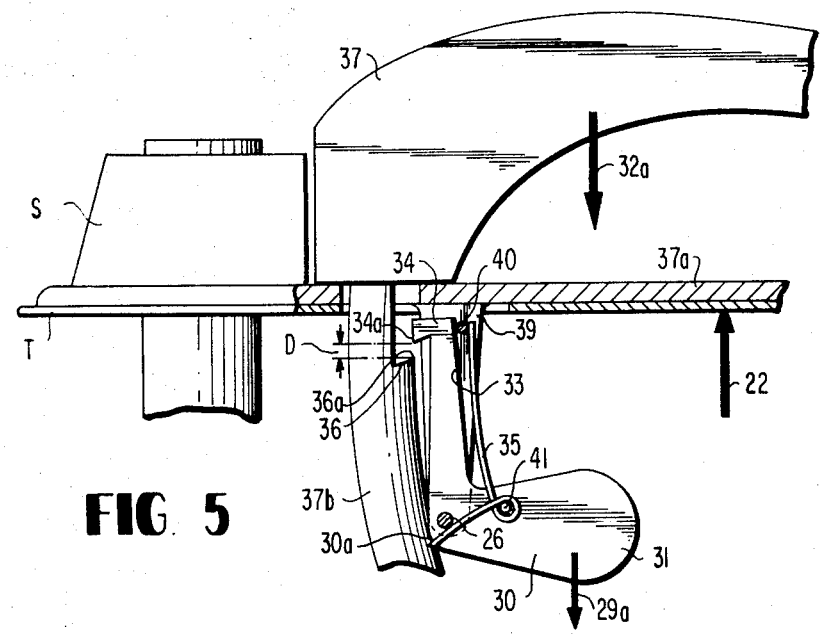
Figure 6:
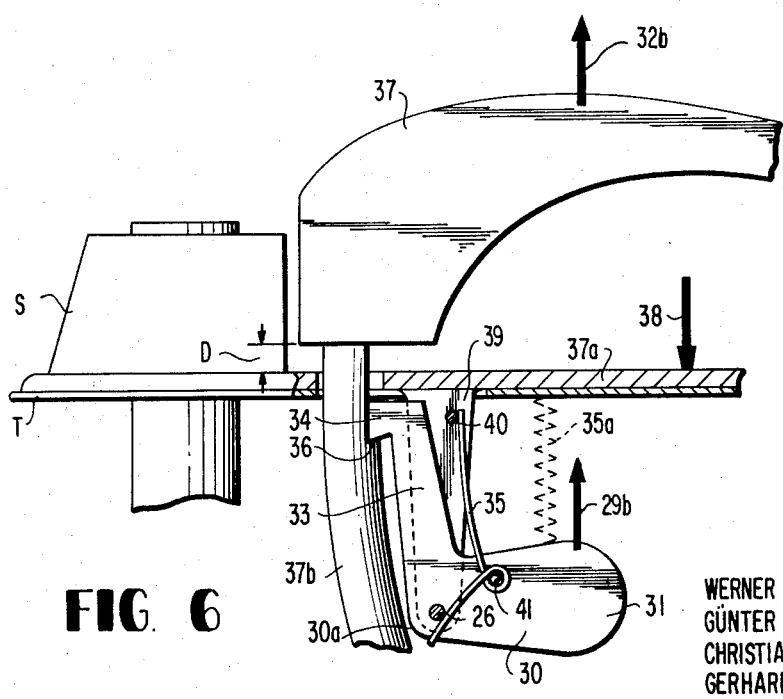

FIG. 5 is a schematic side view of a still further modified embodiment of a door lock in accordance with the present invention with the pull handle thereof in the driving condition of the motor vehicle or in the parked condition, with the pivot blocking means for the handle illustrated in the position in case of an impact from the inside and with the forces occurring under these conditions indicated as arrows; and FIG. 6 is a schematic side view, similar to FIG. 5, with the forces occurring during an impact from the outside indicated as arrows.

Figure 1:
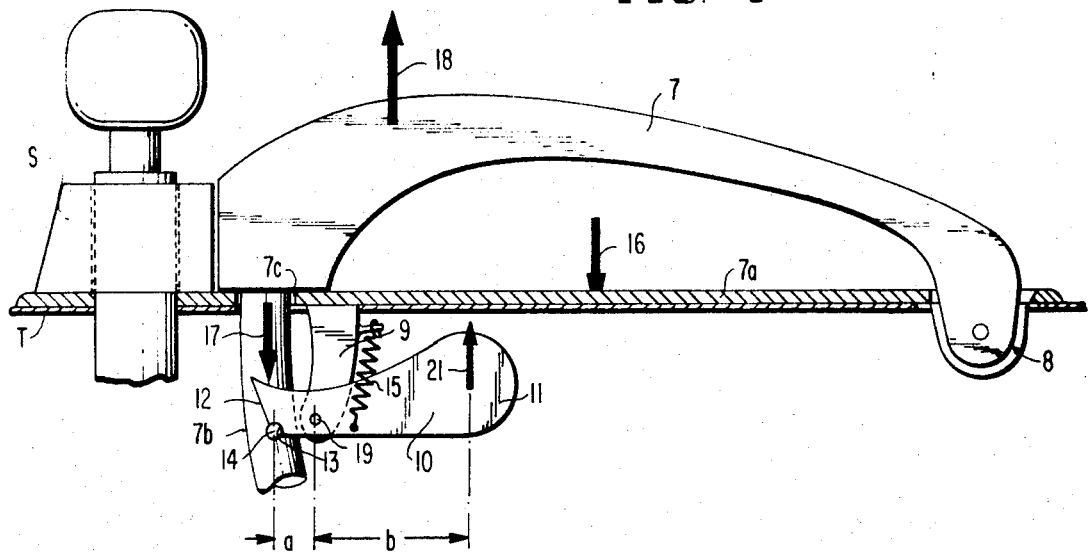
FIG. 1 is a schematic top plan view of a vehicle door lock in accordance with the present invention illustrating the pull handle at a motor vehicle door in the closed position, in the normal driving condition and in the parked condition, and in which the forces occurring during an impact against the outside of the door are indicated as arrows.
Figure 2:
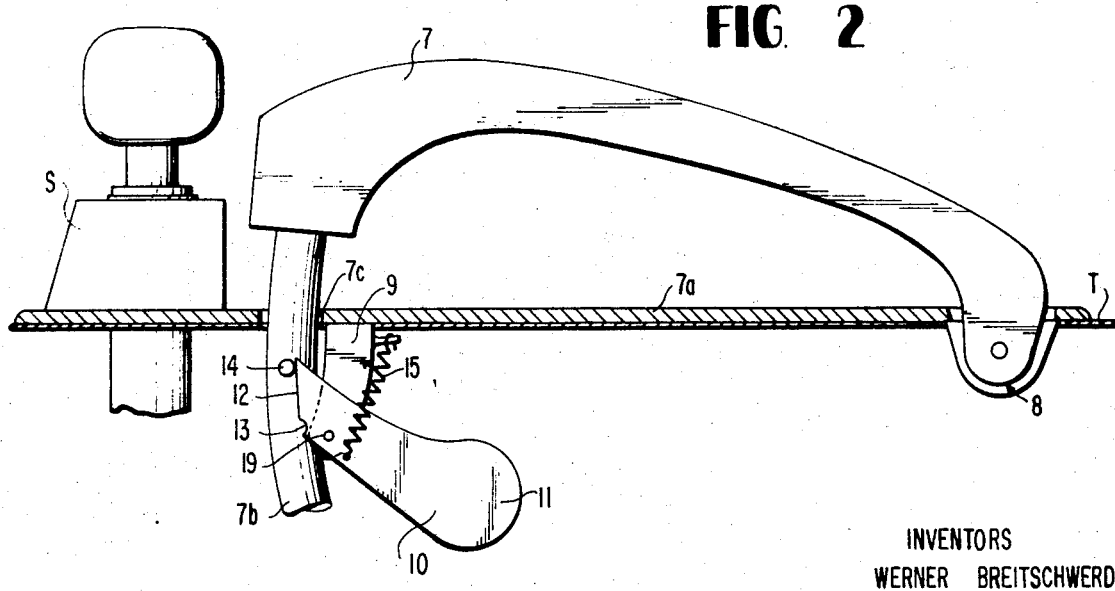
FIG. 2 is a schematic view, similar to FIG. 1, and illustrating the pull handle in the opened lock position.
Figure 3:
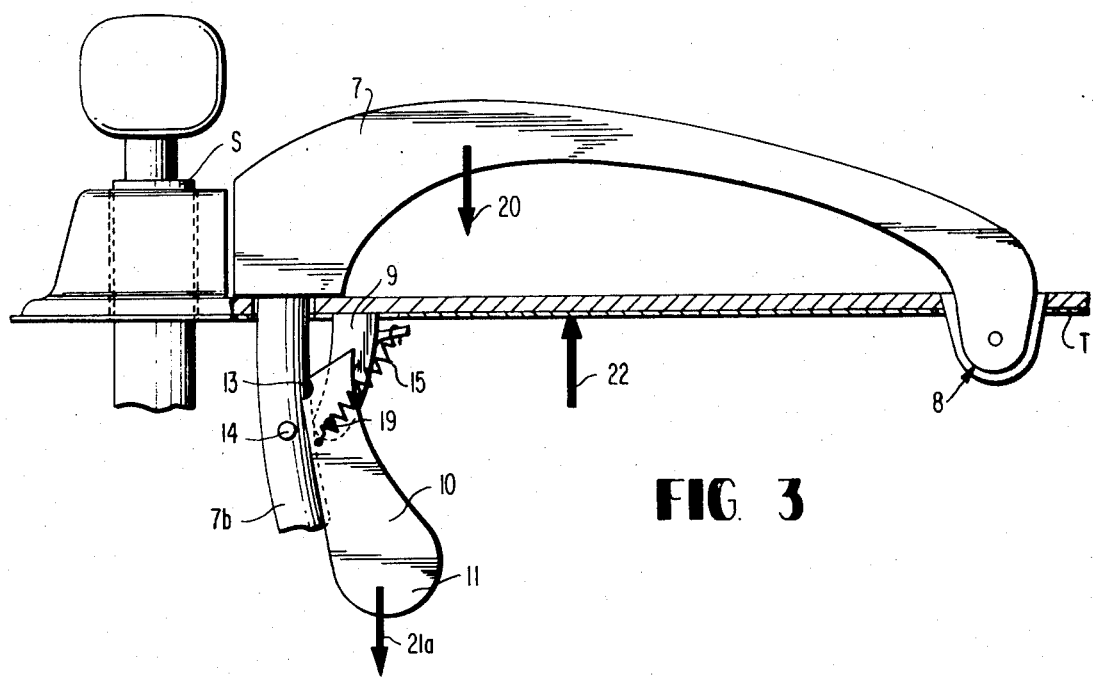
FIG. 3 is a schematic view, similar to FIGS. 1 and 2, illustrating the pull handle in the closing position of the lock, with the forces occurring during an impact from the vehicle inside against the door indicated as arrows.

Referring now to the drawing wherein details of the vehicle door lock, which is of conventional construction as to the rest, are omitted for the sake of simplicity, and wherein like reference numerals are used throughout the various views to designate like parts, and more particularly to FIGS. 1 to 3, the door lock of a motor vehicle illustrated in these figures is opened by pulling at the pull handle 7, by means of which the vehicle door can be pivoted into the opening position. The pull handle 7 is pivotally supported at the door outer cover panel T on an approximately rectangular handle plate 7a approximately at the height of the vehicle belt line with one end thereof in a bearing support generally designated by reference numeral 8. The handle stem or rod 7b projects from its other sturdily constructed end, for example, through an opening 7c in the handle plate 7a directly adjacent the lock cylinder S of the door lock into the lock housing and is force-lockingly connected with the locking lever of the door lock in a conventional manner.

For the equalization for the handle weight, especially for the weight of the sturdy handle end near the lock cylinder S together with the handle stem 7b, a support bracket 9 projects from an edge of the opening 7c in the handle plate 7a into the hollow door interior or into the lock housing. A lever 10 with arms 11 and 12 of dissimilar construction is pivotally supported at the free end of the support bracket 9. The arm 11 is constructed as equalization weight against the high acceleration forces occurring at the handle 7 in case of an accident impact and corresponding to a predetermined and preselected acceleration value.

The arm 12 of the lever 10 is provided at its free end with a recess 13, by means of which the lever 10 is able to partially surround a nose portion 14 extending as pin transversely out of the handle stem 7b at a corresponding height.

The position of the pull handle 7 and of the lever 10 illustrated in FIG. 1 corresponds to the normal position of these parts with a stopped vehicle or with a normally driving motor vehicle. A weak tension spring 15 arranged at the lever arm 10 approximately in the vicinity of the support bracket 9 retains the lever 10 in the illustrated position so that the handle 7 cannot automatically pivot outwardly due to the normal driving movements or when driving on an uneven road surface.

An accident impact (arrow 16) which acts from the outside against the door or the associated vehicle side, produces at the pull handle 7 the force 18 due to the inertia and at the arm 11 of the lever 10 the force 21 due to inertia. The lever pivot axis 19 produces at the arm 12 a force 17 proportional to the lever arm length ($21 \cdot b = a \cdot 17$), which presses the lever arm 12 in the locking direction against the nose portion 14 of the handle stem 7b. The moment of this force 17 about the handle pivot axis in the bearing support 8 is according to the present invention equal to or larger than the force 18 about this point. The equalization mass of the lever arm 11 therefore causes the lever 10 to maintain its illustrated position, i.e., the closed position for the lock and the door.

When pulling the door handle 7, under normal conditions, the latter pivots about its pivot axis at the bearing support 8 (FIG. 2). The pin-like nose portion 14 at the handle stem 7b thereby slides out of the recess 13 in the pivot lever 10 and during the further outward pivotal movement of the door handle 7, slides along the outside of the lever arm 12 whereby the lock is unlatched. The drawspring 15 opposes only a slight resistance to the manual pivoting of the handle in the outward direction.

A strong impact (arrow 22) from the inside against the door (FIG. 3) causes the forces due to inertia of the handle weight (arrow 20) within the area of the door handle 7 and the force of the equalization mass (arrow 21a), which acts in the same direction, of the equalization arm 11 of the lever 10 pivoted in the clockwise direction against the tension of the drawspring 15 to act inwardly, i.e., in the closing or locking direction of the locking lever whereby the pull handle 7 thus does not receive any movement impulse in the direction opening the lock so that the door remains closed.

Figure 4:
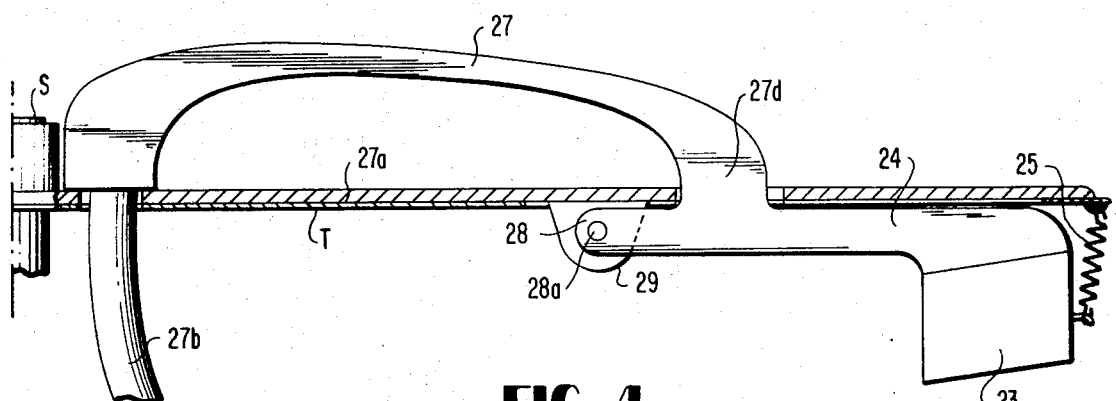
FIG. 4 is a schematic top plan view of a modified embodiment of a pull handle at a motor vehicle door according to the present invention.

In lieu of a lever 10 acting on the handle, a handle 27 (FIG. 4) with a counterweight 23 serving as equalization mass may be constructed as an integral one-piece unit. The end 27d in the extension of its handle part, properly speaking, is thereby strongly widened.

A portion 28 of this handle end 27d is so constructed that it serves as bearing support for the entire handle 27. The handle 27 is extended beyond the handle end 27d by an extension 24 which is constructed as counterweight 23 for the handle part, properly speaking.

The bearing axis 28a is arranged approximately in the center of gravity of the equilibrium of the forces of the handle part and the counter weight. The extension 24 together with the equalization weight 23 is recessed in the lock compartment of the door.

In order to avoid an undesired pivot movement of the handle 27 (FIG. 4) in the opening direction, which due to the equalization weight forms a seesaw, so to speak of, about its axis of rotation 28a, the counter weight 23 is pulled constantly toward the handle plate 27a by means of a weak drawspring 25 so that the handle rod 27b cannot be deflected outwardly in the clockwise direction without some further action or by mere unevennesses in the road surface.

In order to provide in case of different types of impacts a locking or blocking of the movement of movable lock parts essential for the opening thereof, in addition to the handle rod 37b of the handle 37, also a bell crank 30 (FIGS. 5 and 6) may be appropriately provided which is pivotally supported on a pin 26 approximately at its apex 30a. The leg portion 31 of the bell crank 30 supported near the handle rod 37b serves as equalization weight for the pivot movement of the bell crank 30 about its pivot bearing 26 near its apex 30a, which is initiated by a strong impact from the outside (arrow 38 in FIG. 6) by the forces due to inertia. In case of an impact from the inside (arrow 22 in FIG. 5) the inwardly directed force (arrow 29a) of the equalization leg portion 31 acts in the same direction as the mass of the handle or the inertia force 32a, namely, in the closing direction thereof. The outwardly directed leg portion 33 of the bell crank 30 carries at its free end a hook portion 34 directed toward the handle stem 37b. The hook portion 34 may engage in a recess 36 during a counterclockwise pivot movement of the bell crank 30, which recess is cut into the side of the handle rod 37b adjacent thereto with a width exceeding the width of the nose portion 34.

The advantage of this embodiment resides in that the mass of the leg portion 31 can be small because the force 29b due to inertia is needed only for overcoming the spring 35 and/or 35a. The deflection of the handle 37 caused by the force 32b (FIG. 5) due to inertia is prevented, as described, by a pure form-locking engagement between the hook portion 34 and recess 36.

In order to prevent an unintentional engagement of the hook portion 34 as a result of slight vibrations and small impacts during normal drive, a leg spring 35 is appropriately supported at the equalization leg portion 31 of the bell crank 30. One spring leg portion thereby extends underneath the pivot pin 26 in the apex 30a of the bell crank 30 while the other leg portion is stressed against a fixed abutment 40 between the two arms of the support bracket 39 which projects from the outer body panel of the door into the door interior. By means of a loop surrounding a bolt 41, the spring 35 presses the bell crank 30 in the normal condition into the position illustrated in FIG. 5.

The force of the leg spring 35 is insignificant compared to the forces due to inertia released by a strong impact so that it cannot prevent a pivot movement of the bell crank 30 in the locking direction.

In case of an impact (arrow 38) against the outer body cover panel of the door (FIG. 6) the handle 37 may lift off from the handle plate 37a exclusively by the distance D of the edge 34a of the hook portion 34 from the edge 36a of the recess 36 in the handle stem 37b; however, thereafter any movement of the essential movable locking parts is blocked. In order to assure the pivoting back of the bell crank 30 from its locking position, in addition to the leg spring 35 a soft compression spring 35a may be provided between the equalization leg portion 31 of the bell crank 30 and the door outer cover panel T.

While we have shown and described several embodiments in accordance with the present invention, it is understood that the same is not limited thereto, but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A door lock, especially for motor vehicles, with a pull handle means and with an installation acting by means of forces due to inertia on movable parts, significant from a point of view of the mass thereof, for preventing the movement of such parts which would otherwise be caused by inertia forces, characterized in that said pull handle means is pivotally supported at one end thereof at a relatively fixed part of the door and at the other end thereof includes a rod-like connecting means extending into the interior of the door through an opening in an outer body panel, an equalization mass means, and means for pivotally supporting said equalization mass means in the interior of the door in such a manner that in case of a sudden change of the movement of direction forcing the equalization mass means toward the outer body panel of the door, it prevents a pivoting of the handle means in the opening direction.

2. A door lock according to claim 1, characterized in that a support bracket means is provided in the interior of the door adjacent the opening for the rod-like connecting means, said support bracket means carrying a pivotal lever means having an arm portion engaging at the rod-like connecting means and another arm portion constructed as equalization mass means.

3. A door lock according to claim 2, characterized in that a spring engages at the lever means, which urges the lever means into a locking position in which a recess provided in one of the two parts consisting of lever means and rod-like connecting means surrounds a nose portion on the other of said two parts, the spring force of said spring being able to be overcome during the opening of the lock by pulling at the handle means.

4. A door lock according to claim 2, characterized in that a hook portion is provided at one lever arm of the lever means constructed as bell crank, and in that said hook portion engages into a recess provided at the rod-like connecting means when the forces due to inertia of the other lever arm become effective, said hook portion being normally kept out of engagement by the force of a spring means.

5. A door lock according to claim 1, characterized in that the handle means is itself constructed as two-armed lever whose one arm constitutes a pull handle and whose other arm carries a counter weight at an extension thereof, a spring engaging at said counter weight whose force retains the handle means in the usual closing position.

6. A door lock with pivot bearing means for the pull handle means according to claim 5, characterized in that the pivot bearing means is disposed with its pivot axis approximately in the center of gravity of the entire handle means inclusive its extension with counter weight.

* * * * *